(No Model.)
G. W. LOOMIS.
CYLINDER COCK.
No. 325,256. Patented Sept. 1, 1885.
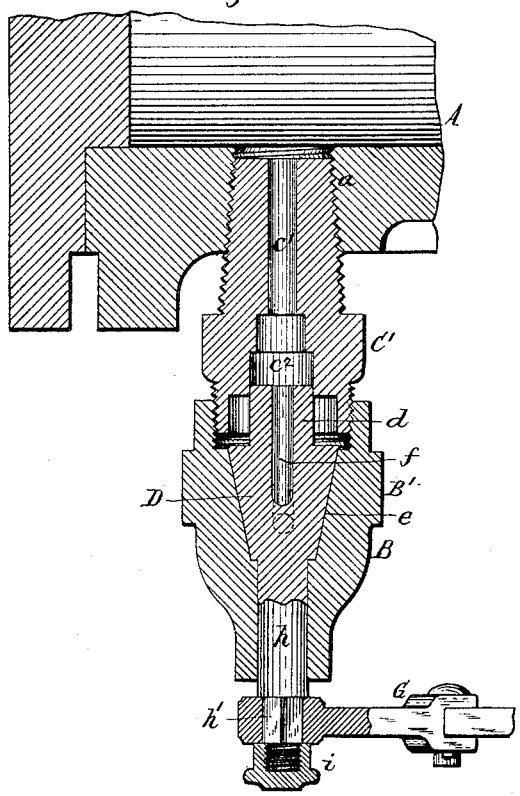
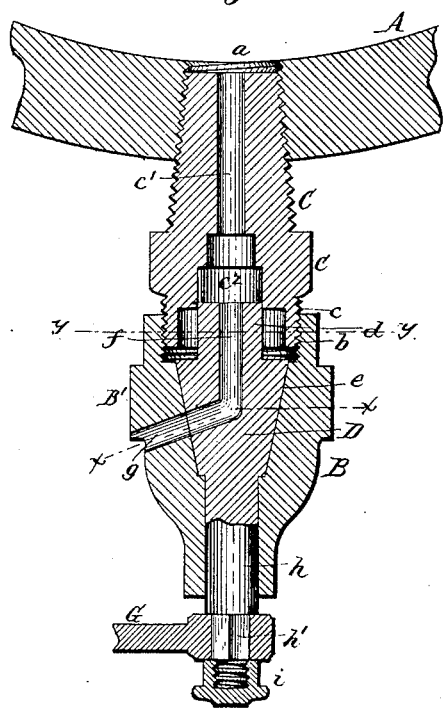
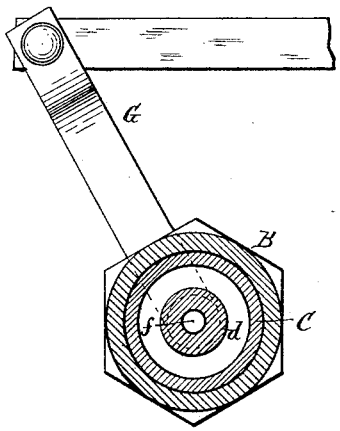
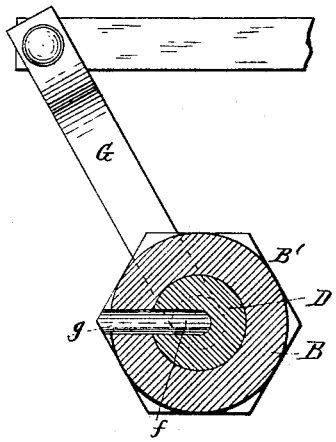
Witnesses:
Theo. L. Popp.
Chas. J. Buchheit.
Geo. W. Loomis, Inventor.
By Wilhelm & Bonner,
Attorneys.

UNITED STATES PATENT OFFICE.

GEORGE W. LOOMIS, OF SYRACUSE, NEW YORK.

CYLINDER-COCK.

SPECIFICATION forming part of Letters Patent No. 325,256, dated September 1, 1885.

Application filed August 22, 1884. (No model.)

*To all whom it may concern:*

Be it known that I, GEORGE W. LOOMIS, of the city of Syracuse, in the county of Onondaga and State of New York, have invented new and useful Improvements in Cylinder-Cocks, of which the following is a specification.

This invention relates more particularly to an improvement in that class of cylinder-cocks which are employed on locomotives for discharging the condensed water or steam from the cylinders.

The object of my invention is to so construct the cock that the pressure of the steam in the cylinder is employed for retaining the plug or valve in its seat, whereby a perfectly-tight fit of the plug in its seat is always maintained, and to simplify the construction of the cock, whereby the parts are not so liable to wear loose, and whereby the cock can be readily applied to the cylinder.

My invention consists, to these ends, of the improvements in the construction of the cock which will be hereinafter fully set forth, and pointed out in the claims.

In the accompanying drawings, Figures 1 and 2 are longitudinal sections of my improved cylinder-cock at right angles to each other. Figs. 3 and 4 are cross-sections in lines $x\ x$ and $y\ y$, Fig. 2, respectively.

Like letters of reference refer to like parts in the several figures.

A represents a portion of a steam-cylinder. B represents the body or casing of the cock, and C a screw-threaded shank or stem, whereby the cock is secured to the cylinder. The stem C is screwed into a threaded opening, $a$, formed at or near the end of the cylinder, and is provided at its outer end with an external screw-thread, $c$, which engages with an internal screw-thread, $b$, formed in the casing B. The casing B and stem C are preferably provided with flat-sided collars B' C', to receive a wrench, whereby they can be readily turned. The shank C is provided with a central bore or passage, $c'$, communicating at its inner end with the cylinder A.

D represents the conical plug or valve, which is seated in a conical seat, $e$, formed in the casing B, in line with the central bore of the shank C. The plug D is flat on its inner end and provided with a cylindrical extension, $d$, which fits into a cavity or cylindrical opening, $c^2$, formed in the outer end of the shank C, and forming an enlargement or continuation of the central opening, $c'$. The extension $d$ serves to guide the inner end of the plug D.

$f$ is an opening or passage formed in the plug D, and extending centrally through the extension $d$, and communicating with the central opening, $c^2$. The passage $f$ extends outward from its inner end to the periphery of the plug, and communicates with an opening, $g$, formed in the sleeve or casing B when the plug or valve is in an open position.

$h$ is a stem formed on the outer end of the plug and extending through the casing B, and provided at its outer end with a square shank, $h'$, to which is applied a lever, G, which is connected to an actuating-lever in a well-known manner, whereby the cock is opened and closed. The lever G is secured to the shank $h'$ by a screw-nut, $i$, applied to the threaded end of the shank.

When the conical valve D is turned in its seat so that the passage $f$ will register with the opening $g$ in the casing, a free passage is formed between the cylinder A and the opening $g$, whereby any steam or water of condensation contained in the cylinder is permitted to escape. By giving the valve a slight turn in its seat, so as to break off the communication between the openings $f$ and $g$, the cock is immediately closed. The pressure of the steam from the cylinder, which fills the central bore, $c'\ c^2$, and presses against the inner face of the plug, forces the latter into its seat and produces a perfectly steam-tight joint between the valve and its seat. The pressure of the steam being exerted centrally and in line with the plug, the latter is caused to wear smooth and equally on all sides, and dust or cinders are prevented from lodging between the valve and its seat.

By constructing the valve sleeve or casing B and stem C in separate parts, the casing and valve can be readily removed when required without removing the stem from the cylinder, and when the casing has been replaced the plug can be easily adjusted to register with the opening in the casing.

My improved cylinder-cock is very simple in construction and durable, and the parts are not liable to wear loose and become leaky, as is usually the case where the conical plug is held in its seat by means of screw-nuts.

I claim as my invention—

1. In a cylinder-cock, the combination, with the stem C and the casing B, provided with a conical seat, $e$, and a side opening, $g$, of a perforated conical plug, D, arranged in the seat $e$, and having its inner end exposed to the steam-pressure, and provided with a cylindrical guide-extension, $d$, substantially as set forth.

2. In a cylinder-cock, the combination, with the casing B and the shank C, provided with a central passage, $c'$, of a conical plug, D, arranged in a conical seat in the casing in line with the central passage, $c'$, and provided with an extension, $d$, projecting into an enlargement, $c^2$, of the passage $c'$, and a stem, $h$, extending through the casing and provided with an actuating-lever, G, substantially as set forth.

Witness my hand this 29th day of July, 1884.

GEO. W. LOOMIS.

Witnesses:
    JNO. J. LYNCH,
    DANL. J. HOGAN.